(12) United States Patent
Hu

(10) Patent No.: US 9,934,398 B2
(45) Date of Patent: Apr. 3, 2018

(54) BLUETOOTH KEY APPARATUS

(71) Applicant: Ta-Wei Hu, Taipei (TW)

(72) Inventor: Ta-Wei Hu, Taipei (TW)

( * ) Notice: Subject to any disclaimer, the term of this patent is extended or adjusted under 35 U.S.C. 154(b) by 206 days.

(21) Appl. No.: 14/995,291

(22) Filed: Jan. 14, 2016

(65) Prior Publication Data
US 2017/0206369 A1    Jul. 20, 2017

(51) Int. Cl.
*G06F 21/62* (2013.01)
*G06F 21/30* (2013.01)
*G06F 21/31* (2013.01)
*H04W 4/00* (2009.01)

(52) U.S. Cl.
CPC ........ *G06F 21/6218* (2013.01); *G06F 21/305* (2013.01); *G06F 21/31* (2013.01); *H04W 4/008* (2013.01)

(58) Field of Classification Search
CPC .... G06F 21/6218; G06F 21/305; G06F 21/31; H04W 4/008
USPC .......................................................... 726/18
See application file for complete search history.

(56) References Cited

U.S. PATENT DOCUMENTS

| | | | | |
|---|---|---|---|---|
| 2008/0057905 | A1* | 3/2008 | Stendal ............. | G07C 9/00182 455/411 |
| 2009/0136035 | A1* | 5/2009 | Lee .................... | G07C 9/00309 380/270 |
| 2016/0143407 | A1* | 5/2016 | Lim ................... | G07C 9/00309 190/101 |
| 2016/0164865 | A1* | 6/2016 | Speicher ............ | H04L 63/0861 726/4 |

* cited by examiner

*Primary Examiner* — Kambiz Zand
*Assistant Examiner* — Benjamin Kaplan
(74) *Attorney, Agent, or Firm* — Jackson IPG PLLC; Demian K. Jackson

(57) ABSTRACT

A Bluetooth key apparatus is provided. The apparatus comprises a control unit; a Bluetooth locking device connected with the control unit; and a Bluetooth unlocking device connected with the control unit. After setting, the Bluetooth unlocking device and the Bluetooth locking device are specifically grouped for handshake communication. After waking up the Bluetooth locking device, the Bluetooth unlocking device receives a password provided by the Bluetooth locking device; and, after the Bluetooth unlocking device inputs the password, the Bluetooth locking device is unlocked. Thus, the present invention effectively enhances anti-theft, distributes key remotely, manages key databases and prevents password from leaking.

8 Claims, 3 Drawing Sheets

BLUETOOTH KEY APPARATUS

TECHNICAL FIELD OF THE INVENTION

The present invention relates to Bluetooth key; more particularly, relates to specifically grouping a Bluetooth locking device and a Bluetooth unlocking device for handshake communication with a password entered and verified to unlock the Bluetooth locking device by the Bluetooth unlocking device, where the present invention effectively enhances anti-theft, distributes key remotely, manages key databases and prevents password from leaking.

DESCRIPTION OF THE RELATED ART

A general electronic locking device usually includes an electromagnetic lock and a plurality of inducing magnetic cards. On using, the electronic locking device is set at an entrance access control. Then, the inducing magnetic card is used for unlocking through radio frequency induction.

However, although the electronic locking device is unlocked with the inducing magnetic card, the card might be stolen and copied by bad-intentioned people and, therefore, become useless.

Hence, the prior art does not fulfill all users' requests on actual use.

SUMMARY OF THE INVENTION

The main purpose of the present invention is to specifically group a Bluetooth locking device and a Bluetooth unlocking device for handshake communication with a password entered and verified to unlock the Bluetooth locking device by the Bluetooth unlocking device, where the present invention effectively enhances anti-theft, distributes key remotely, manages key databases and prevents password from leaking.

To achieve the above purpose, the present invention is a Bluetooth key apparatus, comprising a control unit, a Bluetooth locking device and a Bluetooth unlocking device, where the Bluetooth locking device is connected with the control unit; the Bluetooth unlocking device is connected with the control unit and the Bluetooth locking device; after setting, the Bluetooth unlocking device and the Bluetooth locking device are specifically grouped for handshake communication; after waking up the Bluetooth locking device, the Bluetooth unlocking device receives a password provided by the Bluetooth locking device; and, after the Bluetooth unlocking device inputs the password, the Bluetooth locking device is unlocked. Accordingly, a novel Bluetooth key apparatus is obtained.

BRIEF DESCRIPTION OF THE DRAWINGS

The present invention will be better understood from the following detailed description of the preferred embodiments according to the present invention, taken in conjunction with the accompanying drawings, in which.

DESCRIPTION OF THE PREFERRED EMBODIMENTS

The following description of the preferred embodiments is provided to understand the features and the structures of the present invention.

Figure 1:
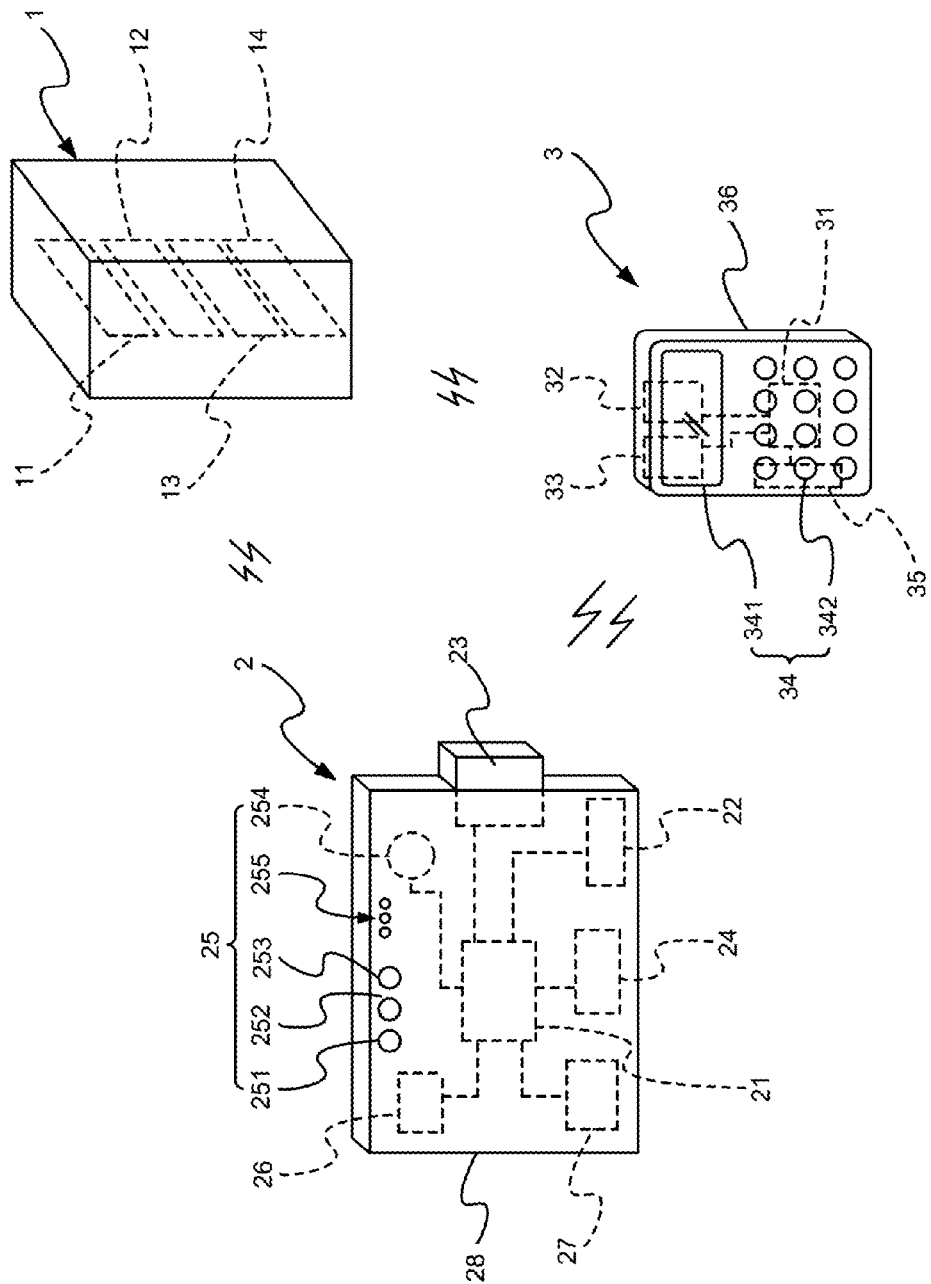
FIG. 1 is the structural view showing the first preferred embodiment according to the present invention.
Figure 2:
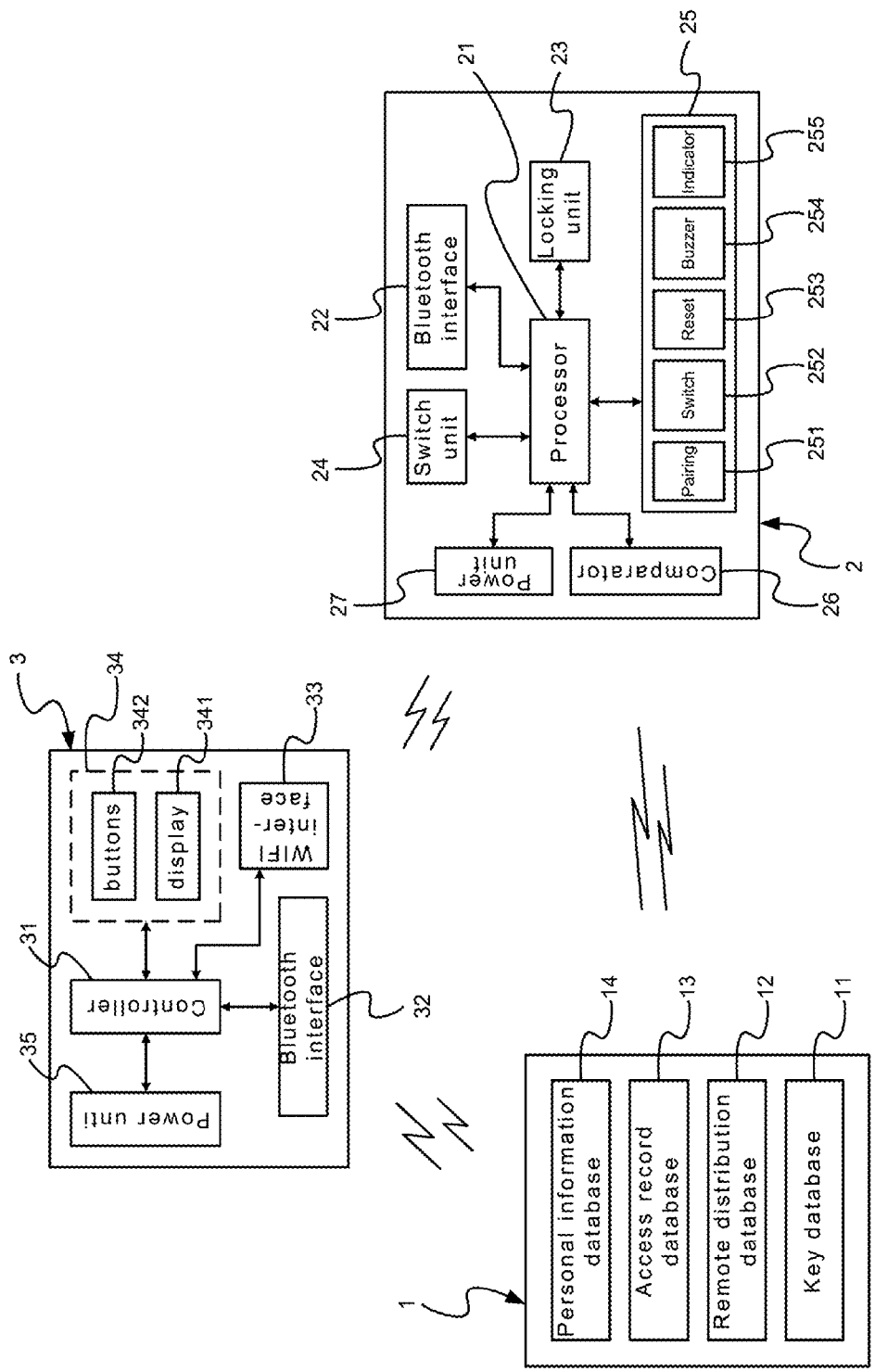
FIG. 2 is the function-block view showing the first preferred embodiment.
Figure 3:
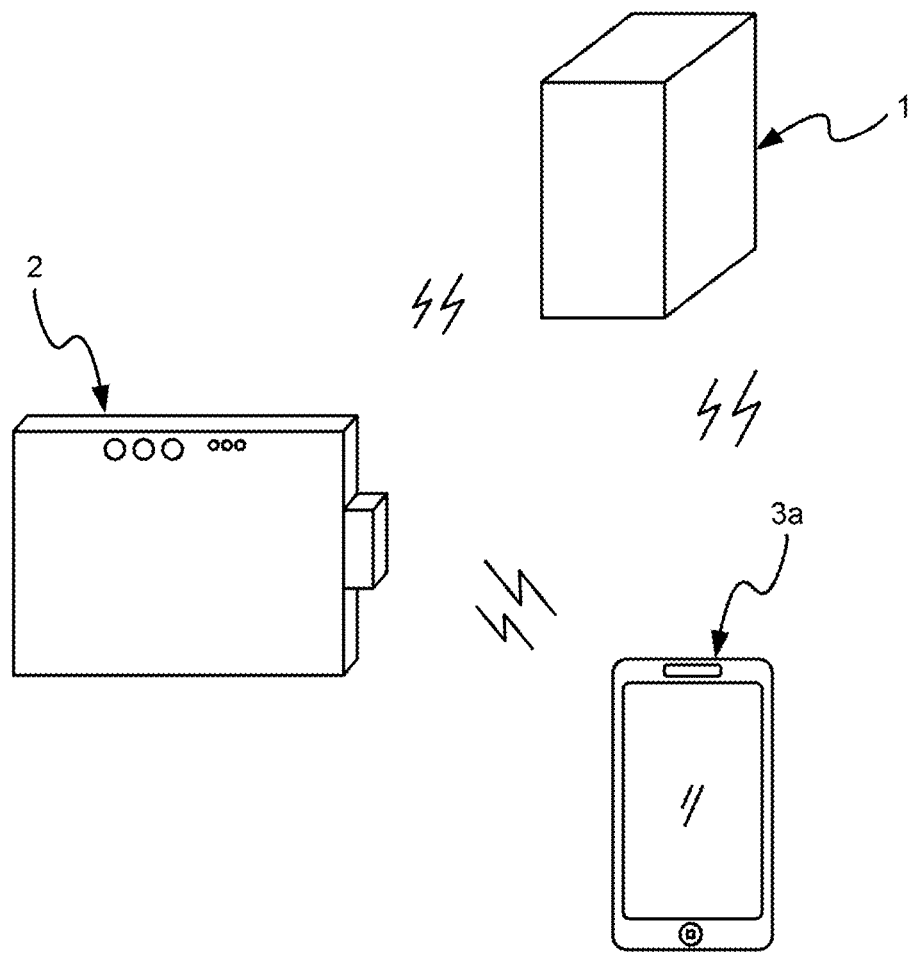
FIG. 3 is the structural view showing the second preferred embodiment.

Please refer to FIG. 1~FIG. 3, which are a structural view showing a first preferred embodiment according to the present invention; a function-block view showing the first preferred embodiment; and a structural view showing a second preferred embodiment. As shown in the figures, the present invention is a Bluetooth key apparatus, comprising a control unit 1, a Bluetooth locking device 2 and a Bluetooth unlocking device 3.

The control unit 1 comprises a key database 11, a remote distribution database 12, an access record database 13 and a personal information database 14.

The Bluetooth locking device 2 comprises a processor 21; a Bluetooth communication interface 22 connected with the processor 21; a locking unit 23 connected with the processor 21; a switch unit 24 connected with the processor 21; an input/output (I/O) interface 25 connected with the processor 21; a comparator 26 connected with the processor 21; and a power unit 27 connected with the processor 21. Therein, the processor 21, the Bluetooth communication interface 22, the locking unit 23, the switch unit 24, the I/O interface 25, the comparator 26 and the power unit 27 are combined with a housing 28, while the locking unit 23 is set at a side of the housing 28 and the I/O interface 25 is set on a surface of the housing 28. Besides, the I/O interface 25 comprises a pairing button 251, a switch button 252, a reset button 253, a buzzer 254 and an indicator light 255.

The Bluetooth unlocking device 3 is connected with the control unit 1 and the Bluetooth locking device 2. After setting, the Bluetooth unlocking device 2 and the Bluetooth locking device 3 are specifically grouped for handshake communication. After waking up the Bluetooth locking device 2, the Bluetooth unlocking device 3 receives a password provided by the Bluetooth locking device 2; and, after the Bluetooth unlocking device 3 inputs the password, the Bluetooth locking device 2 is unlocked. Therein, the Bluetooth unlocking device 3 comprises a controller 31; a Bluetooth communication interface 32 connected with the controller 31; a WIFI communication interface 33 connected with the controller 31; an I/O unit 34 connected with the controller 31; and a power unit 35 connected with the controller 31. The controller 31, the Bluetooth communication interface 32, the WIFI communication interface 33, the I/O unit 34 and the power unit 35 combined with a housing 36 and the I/O unit 34 is set on a surface of the housing 36. The I/O unit 34 comprises a display screen 341 and a plurality of buttons 342, where related buttons are included, like a switch button, a start button, number buttons, a confirm button, a cancel key, etc. The I/O unit 34 is a touch panel.

Thus, a novel Bluetooth key apparatus is obtained.

On using the present invention, related parameters of the Bluetooth communication interface 32 and the WIFI communication interface 33 of the Bluetooth unlocking device 3 are set for the control unit 1, as described below:

1. Key database 11: Parameters for adding keys, managing locks and pairing hardware are set. On adding keys, users and managers can distribute the following four types of keys: manager keys, non-aging keys, periodic keys and timeliness keys; or delete other owners of a specified key. On managing locks, subsidiary information is managed, including names, locations increased, etc. On pairing hardware, mobile phones (up to 5 group) and Bluetooth unlocking devices 3 (actual distribution amount) are paired.

2. Remote distribution database 12: Keys are distributed to other App users remotely. The first group is free of charge; but other remote distributed keys are unlimited in number but are charged. Authentications are sent by e-mail, which will bring out a web link for verification only.

3. Access record database 13: At most 20 access records of a Bluetooth unlocking device 3 are displayed with regard to its users and managers.

4. Personal information database 14: Information of users or owner of a Bluetooth unlocking device 3 are set or modified, including name, e-mail, phone, sex, age, etc.; and uploaded to a database after modification.

After finishing the above settings, the processor 21 and the controller 31 are used as control centers for the Bluetooth locking device 2 and the Bluetooth unlocking device 3 on operation. The power unit 27,34 provides power to the Bluetooth locking device 2 and the Bluetooth unlocking device 3 for operation. When the power unit 27 for the Bluetooth locking device 2 shows a low battery condition, the buzzer 254 outputs a warning with coordination of the indicator light 255. The Bluetooth communication interface 22 of the Bluetooth locking device 2 and the Bluetooth communication interface 22 of the Bluetooth unlocking device 3 are specifically grouped for communication, which means that non-related Bluetooth interface can not communicate with specified Bluetooth lock. On establishing connection, the I/O interface 34 (the display screen 341 and the buttons 342) of the Bluetooth unlocking device 3 are used with coordination of the I/O interface 25 of the Bluetooth locking device 2. The Bluetooth locking device 2 is only controlled by the paired Bluetooth unlocking device 3, where the buzzer 254 makes a short noise for noticing start-action and a long noise after finishing pairing. The switch button 252 controls encryption for locking and unlocking and drives the locking unit 23 after receiving a command. For resetting the parameters, the reset button 253 is long pressed for a few seconds to restore factory settings while the buzzer 254 makes a long sound. On processing the above operations, the indicator light 255 shows different colors and flashes for reminding. One of the Bluetooth locking device 2 can specifically grouped with a plurality of the Bluetooth unlocking device 3 for connection. Then, the Bluetooth locking device 2 is set at an entrance access control with the locking unit 23 used for locking.

When the user wants to unlock the locking unit 23 of the Bluetooth locking device 2, the buttons 342 of the I/O unit 34 on the Bluetooth unlocking device 3 is used to activate the Bluetooth communication interface 32 for transmitting a waking-up signal to Bluetooth locking device 2. After the Bluetooth communication interface 22 of the Bluetooth locking device 2 receives the waking-up signal, the Bluetooth locking device 2 and the Bluetooth unlocking device 3 are specifically grouped for handshake communication. Then, a password is generated for the Bluetooth locking device 3 to be displayed on the display screen 341. The user enters the password which is, then, 32bit-encryped and transmitted to the Bluetooth locking device 2. The comparator 26 compares and verifies the password. After confirmation, the locking unit 23 is unlocked and an access record of the locking unit 23 will be transmitted to the access record database 13 of the control unit 1.

After being received by the Bluetooth unlocking device 3, the password has to be entered within a period of time (for example: 10 seconds); or else, the password will fail. Thus, anti-theft is enhanced.

Besides, the Bluetooth unlocking device 3a can be a mobile phone, a smart phone, a smart watch, a personal computer or a tablet (as shown in FIG. 3). The unlocking process for the Bluetooth locking device 2 is the same as described above. What differs is that, after the Bluetooth unlocking device 3a receives the encrypted password, the password has to be entered within 30 seconds; or else, the password will fail.

When a user forgets the password, the Bluetooth unlocking device 3,3a will transmit a message of forgetting password to the key database 11 of the control unit 1. After the personal information database 14 confirms the user's information, the remote distribution database 12 will transmit the password to the Bluetooth unlocking device 3,3a. When the Bluetooth unlocking device 3,3a is lost, the key database 11 of the control unit 1 will delete the lost key and distribute new key while all right of the lost key will be cancelled.

To sum up, the present invention is a Bluetooth key apparatus, where a Bluetooth locking device and a Bluetooth unlocking device are specifically grouped for handshake communication with a password entered and verified to unlock the Bluetooth locking device by the Bluetooth unlocking device; and the present invention effectively enhances anti-theft, distributes key remotely, manages key databases and prevents password from leaking.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A Bluetooth key apparatus, comprising:
    a control unit;
    a Bluetooth locking device, said Bluetooth locking device being connected with said control unit,
        wherein said Bluetooth locking device comprises a processor; a Bluetooth communication interface connected with said processor; a locking unit connected with said processor; a switch unit connected with said processor; an input/output (I/O) interface connected with said processor; a comparator connected with said processor; and a power unit with said processor; and
    a Bluetooth unlocking device, said Bluetooth unlocking device being connected with said control unit and said Bluetooth locking device,
    wherein, after setting, said Bluetooth unlocking device and said Bluetooth locking device are specifically grouped for handshake communication; and
    wherein, after waking up said Bluetooth locking device, said Bluetooth unlocking device obtains a password provided by said Bluetooth locking device;
    and, after said Bluetooth unlocking device inputs said password, said Bluetooth locking device is unlocked,
    wherein said processor, said Bluetooth communication interface, said locking unit, said switch unit, said input/output (I/O) interface, said comparator and said power unit are combined with a housing; and
    wherein said locking unit is located at a side of said housing and said I/O interface is located on a surface of said housing.

2. The Bluetooth key apparatus according to claim 1, wherein said control unit comprises a key database, a remote distribution database, an access record database and a personal information database.

3. The Bluetooth key apparatus according to claim 1, wherein said I/O interface comprises a pairing button, a switch button, a reset button, a buzzer and an indicator light.

4. The Bluetooth key apparatus according to claim 1, wherein said I/O unit is a touch panel.

5. The Bluetooth key apparatus according to claim 1, wherein said Bluetooth unlocking device comprises a controller; a Bluetooth communication interface connected with said controller; a WIFI communication interface connected with said controller; an I/O unit connected with said controller; and a power unit connected with said controller.

6. The Bluetooth key apparatus according to claim 5, wherein said controller, said Bluetooth communication interface, said WIFI communication interface, said I/O unit and said power unit are combined with another housing; and wherein said I/O unit is located on a surface of said another housing.

7. The Bluetooth key apparatus according to claim 5, wherein said I/O unit comprises a plurality of buttons.

8. The Bluetooth key apparatus according to claim 1, wherein said Bluetooth unlocking device is selected from a group consist of a mobile phone, a smart phone, a smart watch, a personal computer and a tablet.

* * * * *